_United States Patent_ [19]

Dearman

[11] 3,952,936
[45] Apr. 27, 1976

[54] REFORMING PIPE CLAMP

[76] Inventor: Timothy C. Dearman, 4191 E. Stanley Road, Mt. Morris, Mich. 48458

[22] Filed: Oct. 7, 1974

[21] Appl. No.: 512,527

[52] U.S. Cl. ............................... 228/49; 269/43; 269/287
[51] Int. Cl.² ...................................... B23K 37/04
[58] Field of Search .................... 29/200 J, 200 P; 219/161; 228/44, 49; 269/37, 43, 44, 130, 131, 132, 287

[56] References Cited
UNITED STATES PATENTS

| | | | |
|---|---|---|---|
| 2,108,077 | 2/1938 | Robinson | 269/43 |
| 2,800,867 | 7/1957 | Smith | 269/287 X |
| 3,414,950 | 12/1968 | Harrison | 269/43 X |
| 3,467,295 | 9/1969 | Watson | 228/49 |
| 3,619,891 | 11/1971 | Harrison | 269/131 X |
| 3,666,159 | 5/1972 | Watson | 29/200 P X |

FOREIGN PATENTS OR APPLICATIONS 523,980  4/1931  Germany ....................... 269/37

_Primary Examiner_—Al Lawrence Smith
_Assistant Examiner_—K. J. Ramsey
_Attorney, Agent, or Firm_—Learman & McCulloch

[57] ABSTRACT

A reforming pipe clamp comprises a pair of rigid arcuate members joined at corresponding ends to form an annulus adapted to encircle a pipe adjacent one end thereof, the inside diameter of the annulus being greater than the outside diameter of the encircled pipe. The annulus has a plurality of circumferentially spaced, radially adjustable force applying members which are engageable with the encircled pipe for reforming the pipe. The annulus carries circumferentially spaced supports capable of projecting beyond the end of the encircled pipe to provide support for one end of a confronting pipe that is to be joined to the encircled pipe. The supports are movable from their supporting position to a second position in which the entire circumference of the joint between the two pipes is accessible to a welder.

12 Claims, 9 Drawing Figures

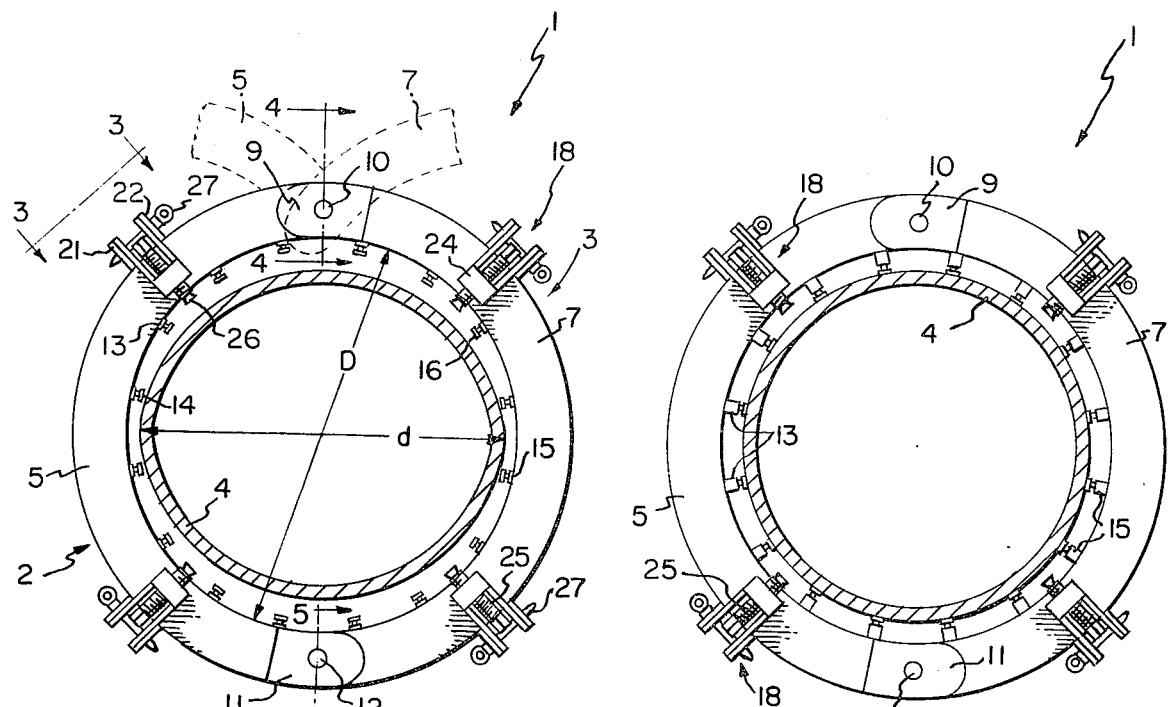
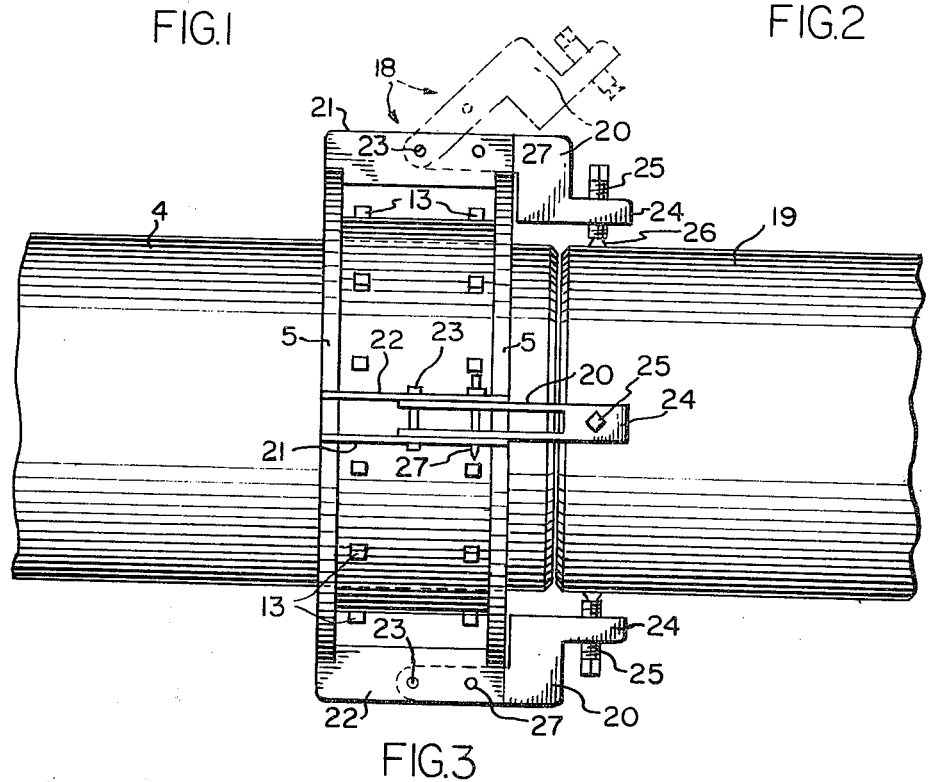
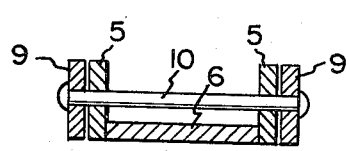
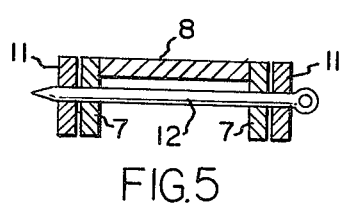

REFORMING PIPE CLAMP

This invention relates to a reforming pipe clamp of the kind adapted to be applied in encircling relation to one end of a pipe and reform the latter to a different cross-sectional configuration. The clamp is provided with a plurality of supports by means of which a pipe that is to be joined to the encircled pipe may be supported in confronting relation with the encircled pipe. The supports are movable from positions in which they overlie and span the joint between the confronting pipes to a position in which they overlie only the encircled pipe, thereby permitting access by a welder to the entire circumference of the joint.

When one pipe length is to be welded to another pipe length, the confronting ends of the two pipes are positioned close to one another so as to enable a welder to weld the two pipes to one another. Although the cross-sectional configuration of the two pipe lengths ideally should be identical, e.g. circular, it rarely occurs that the ends of two pipes match perfectly. Especially is this true in those instances in which a section of a pipeline must be cut from the line and replaced by a fresh length of pipe. Commonly, the pipe from which a section has been cut is somewhat elliptical, rather than circular, whereas the replacement pipe length is more circular. If an acceptable joint between the two pipe lengths is to be achieved, the configurations of the confronting ends of the pipes must be made to match. Thus, at least one of the pipes must be reformed or reshaped so as to match the configuration of the other. Reforming is accomplished by the use of a reforming clamp.

A conventional reforming clamp is circular and has a pair of axially spaced bands, each of which has a sufficiently large diameter to encircle the pipe lengths that are to be joined. The axial length of such a clamp is sufficient to span the joint between the two pipe lengths and apply clamping forces to the confronting ends of each pipe length. In the conventional reforming clamp the bands are spaced by a plurality of bars or rods which also span the joint between the two pipe lengths, the bars being spaced circumferentially from one another so as to enable a welder to tack weld the two pipe lengths at circumferentially spaced points. Thereafter, the clamp is removed so as to enable the welder to complete the welding together of the two pipes.

When the reforming clamp is removed from the joint between two pipe lengths that have been joined by tack welding, the reformed pipe or pipes tend to turn to the configurations they possessed prior to being reformed. In many cases the tack weld is incapable of overcoming this tendency with the result that the weld breaks or cracks, thereby necessitating a repetition of the welding operation.

When two pipes of substantial wall thickness are to be joined together, welding material is deposited in the joint in successive passes so that the weldment builds up gradually in thickness. To prevent the formation of air pockets between successively deposited weldment, the previously deposited weldment conventionally is subjected to a grinding operation to provide a smooth surface. When using clamps of the kind having parts thereof spanning the joint between the two pipes to be welded, it is not possible to perform the grinding operation circumferentially of the joint until the clamp is removed.

An object of this invention is to provide a reforming clamp adapted for use when welding two confronting pipe lengths to one another, the clamp being capable of encircling and reforming the end of one pipe length to correspond to the configuration of the end of the confronting pipe length and also being provided with supports adapted to span the joint between the two pipe lengths so as to support and align that end of the pipe length which confronts the reformed pipe.

Another object of the invention is to provide a reforming clamp of the character described and wherein the supports for the pipe that is to be joined to the reformed pipe may be moved to a position in which the entire joint is accessible to the welder and without necessitating adjustment of the position of the reforming clamp.

Other objects and advantages of the invention will be pointed out specifically or will become apparent from the following description when it is considered in conjunction with the appended claims and the accompanying drawings, in which:

FIG. 1 is an elevational view of a reforming clamp constructed in accordance with the invention and encircling an out-of-round pipe, the pipe being shown in section;

FIG. 2 is a view like FIG. 1, but illustrating reforming of the pipe to substantially circular configuration;

FIG. 3 is a side elevational view, taken substantially along the line 3–3 of FIG. 1, illustrating the clamp applied to one end of one pipe length and supporting the confronting end of a pipe that is to be welded to the encircled pipe;

FIG. 4 is a sectional view taken along the line 4—4 of FIG. 1;

FIG. 5 is a sectional view taken on the line 5—5 of FIG. 1;

Figure 6:
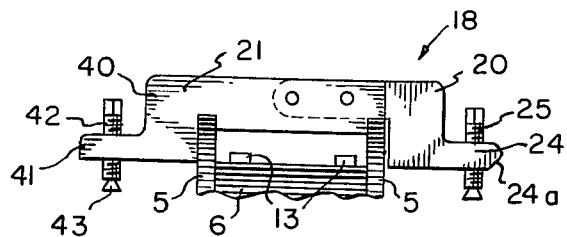
FIG. 6 is a fragmentary, side elevational view similar to FIG. 3, but illustrating a modified construction.

A reforming clamp constructed in accordance with the embodiment shown in FIGS. 1 – 5 is designated generally by the reference character 1 and comprises a pair of rigid, arcuate members 2 and 3 arranged to form an annulus adapted to encircle a pipe 4, the annulus having an inside diameter D greater than the maximum diametral dimension d of the pipe 4. The arcuate member 2 comprises a pair of semi-circular metal bands 5 that are joined to and spaced apart by an arcuate metal web 6. The member 3 comprises a similar pair of semi-circular bands 7 joined to and spaced apart by a similar web 8.

Welded or otherwise suitably secured to the bands 7 at one end of the member 3 is a pair of metal straps 9 between which the bands 5 at the confronting end of the member 2 are received. The bands 5 and the straps 9 are provided with coaxial openings through which a pivot pin 10 extends so as to enable the members 2 and 3 to be swung from the positions shown in full lines in FIG. 1 to the positions indicated in dotted lines, thereby facilitating assembly and disassembly of the clamp 1 with and from the pipe 4.

That end of the member 2 opposite the pivot pin 10 has fixed thereto a pair of metal straps 11 between which the bands 7 may be received. The bands 7 and the straps 11 are provided with coaxial openings through which a locking pin 12 removably may pass. When the pin 12 occupies the position shown in FIG. 1 and 5, the members 2 and 3 are locked together, but when the pin 12 is removed, the members 2 and 3 may be swung apart about the axis of the pivot pin 10.

The web 6 is provided with one or more rows of circumferentially spaced, radially adjustable force applying screws 13, each of which passes through a threaded opening in the web 6 and terminates at its radially inner end in a swivelly mounted foot 14 that is adapted to bear against the outer surface of a pipe encircled by the clamp 1. The web 8 has similar force applying screws 15 each of which terminates in a similar swivelly mounted foot 16. If desired, the webs 6 and 8 may have cavities (not shown) in their inner surfaces in which the respective swivel feet 14 and 16 may be accommodated.

The clamp 1 is provided with a plurality of support members 18 which are adapted to provide support for one end of a pipe 19 that is to be welded to the pipe 4. Each support 18 comprises a body 20 that is received between a pair of plates 21 and 22 that are welded to the respective bands 5 and 7. The body 20 and the plates 21 and 22 are provided with aligned openings through which extends a pivot pin 23 by means of which the body 20 is mounted for swinging movements between the positions shown in full lines and in dotted lines in FIG. 3.

At one end of the body 20 is a flange 24 which extends beyond the clamp members 2 and 3 a distance sufficient to span the joint between the pipes 4 and 19 and overlie the latter. The flange has a threaded opening through which extends a threaded adjusting screw 25 that terminates at one end in a swivelly mounted foot 26 which is adapted to engage the outer surface of the pipe 19.

The body 20 and the plates 21 and 22 also are provided with aligned openings through which a removable latch pin 27 extends so as to latch the support 18 in a position in which the adjusting screw 25 extends radially of the clamp 1 for engagement with the pipe 19.

In the operation of the apparatus thus far described, the clamp 1 is placed in encircling relation with the pipe 4 and adjacent the free end of the latter. The locking pin 12 then is fitted in place so as to prevent swinging movement of the members 2 and 3 about the axis of the pivot pin 10. The force applying screws 13 and 15 then may be adjusted radially of the clamp to apply circumferentially spaced forces on the pipe to change its cross-sectional configuration. From a comparison of FIGS. 1 and 2, it will be apparent that the pipe 4 has been reformed from the elliptical configuration shown in FIG. 1 to the substantially circular configuration shown in FIG. 2.

Following reforming of the pipe 4, one end of the pipe 19 may be positioned adjacent the free end of the pipe 4 and between the inner ends of the adjusting screws 25. The screws 25 may be adjusted so as to shift the pipe to a position in which it is coaxial with the pipe 19. If the configurations of the confronting ends of the pipes 4 and 19 do not match, the force applying screws 13 and 15 may be readjusted so as to conform the configuration of the pipe 4 to that of the pipe 19. Such readjustment of the screws 13 and 15 may require further adjustment of the support screws 25 to maintain the coaxial relationship between the pipes 4 and 19.

Although it is possible that the screws 25 could be utilized to reform the pipe 19, to some extent, it is preferred that these screws be used only for positioning and holding the pipe 19 coaxially with the pipe 4.

Following the reforming and positioning operations in such manner that the confronting ends of the pipes 4 and 19 match and are coaxial, a welder may apply weldment (not shown) to the joint between the pipes 4 and 10. Depending upon the clearance between the support members 18 and the outer surfaces of the pipes 4 and 19, weldment may be deposited initially in the joint around the entire periphery of the latter or only between the support members 18. In any case, sufficient weldment may be deposited initially to assure that the pipe lengths 4 and 19 will be joined.

Following the initial welding operation, the latch pins 27 may be withdrawn from the support members 18 and the latter swung about the axes of the pivot pins 23 so as to expose the entire circumference of the joint between the two pipes. The clamp 1 will remain in position on the pipe 4 so as to maintain the latter in its reformed configuration, thereby avoiding the imposition of strain on the weldment due to the tendency of the pipe 4 to return to its unreformed configuration. Welding and grinding operations then can be completed, at which time the force applying screws 13 and 15 may be retracted from engagement with the pipe 4 and the locking pin 12 withdrawn so as to enable the clamp members 2 and 3 to be swung apart and removed from the pipe. By the time the clamp 1 is removed from the pipe, the pipes 4 and 19 will have been securely welded to one another. Consequently, forces created by the tendency of the pipe 4 to return to its unreformed configuration are absorbed not only by the weldment, but also by the pipe 19.

FIG. 6 discloses a clamp like the clamp 1 except that the plates 21 and 22 are provided with extensions, one of which is shown at 40, which project in a direction opposite the support 18 so as to overlie the pipe on which the clamp 1 is fitted. The plate extensions 40 are spanned by a bar 41 through which an adjusting screw 42 extends, the radially inner end of the screw terminating in a swivelly mounted foot 43. The screw 42 functions as a reinforcement for the clamp members 2 and 3 to avoid subjecting the latter to excessive torsional forces.

FIG. 6 also discloses tapering of the free end of the flange 24 of the support 18 so as to provide a beveled surface 24a that facilitates initial alignment of the pipes 4 and 19.

Figure 8:
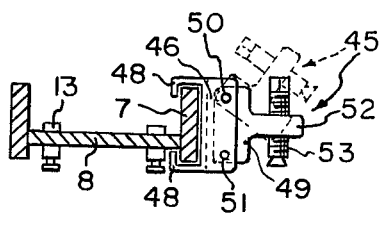
FIG. 8 is a sectional view taken on the line 8—8 of FIG. 7.
Figure 7:
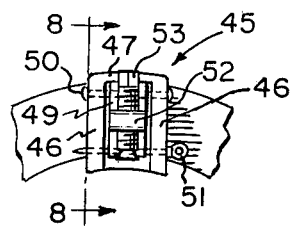
FIG. 7 is a fragmentary elevational view similar to FIG. 1, but illustrating a further embodiment.

In the embodiment shown in FIG. 7 and 8, the clamp 1 is the same as that described earlier, but the supports for the pipe 19 are different from the supports 18. In the modified embodiment a support 45 comprises a pair of spaced apart plates 46 joined by a web 47 that terminates at its opposite ends in L-shaped flanges 48 which slideably embrace the radially inner and outer edges of the associated arcuate band 5 and 7. A body 49 is pivoted between the plates 46 by means of a pivot pin 50. The body 49 and the plates 46 are provided with aligned openings for the accommodation of a removable latch pin 51. An extension 52 projects from one side of the body and carries an adjustable screw 53 like the screw 25.

The supports 45 function in the same manner as the supports 18, i.e., each body 49 is capable of being swung about the axis of the pivot 50 from a position in which the associated adjusting screw 53 overlies the pipe 19 to a position in which the entire circumference of the joint between the two pipes 4 and 19 is exposed. In addition, the supports 45 are adjustable circumferentially of the clamp 1 to facilitate precise matching of the confronting ends of the two pipes.

Figure 9:
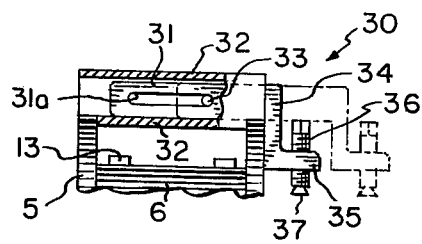
FIG. 9 is a view like FIG. 6, but illustrating a further embodiment.

FIG. 9 discloses a clamp like the clamp 1 except for the support members. The clamp of the modified embodiment has a plurality of support members 30 each of which comprises a body 31 slidably accommodated between the plates 21 and 22, the latter being spanned by upper and lower plates 32 which, together with the plates 21 and 22, form a housing for the body 31. A pin 33 spans the plates 21 and 22 and passes through an elongate slot 31a in the body 31 to limit the extent of sliding movement of the body and to prevent radial outward movement thereof. The body 31 includes a radially extending leg 34 which terminates at its inner end in an axially extending foot 35 through which an adjusting screw 36 extends and terminates at its radially inner end in a swivel foot 37.

The body 31 is slidable axially of the clamp 1 between the positions shown in full and in dotted lines in FIG. 6. When the body 31 is in the position shown in dotted lines, the member 30 spans the joint between a pair of confronting pipes so as to enable the adjusting screw 36 to position and support the pipe 19 coaxially with the pipe 4. In the full line position, however, the member 30 is retracted into its housing to a position in which the entire circumference of the joint between the two pipes is accessible to the welder.

The operation of a clamp equipped with the support members 30 is the same as has been described in connection with the earlier embodiments.

The disclosed embodiments are representative of presently preferred forms of the invention, but are intended to be illustrative rather than definitive thereof. The invention is defined in the claims.

I claim:

1. A reforming pipe clamp adapted to encircle a length of pipe adjacent one end thereof, said clamp comprising a rigid annulus having an inside diameter greater than the outside diameter of the pipe to be encircled; a plurality of circumferentially spaced, independent radially adjustable force applying members carried by said annulus for movement radially thereof into and out of forcible engagement with a pipe encircled by said annulus; a plurality of support members adapted to support a second length of pipe in end to end confrontation with a pipe encircled by said annulus; means mounting each of said support members on said annulus for movements relative thereto regardless of whether said force applying members forcibly engage a pipe encircled by said annulus, each of said support members being movable independently of said force applying members from a first position in which said support member extends axially beyond one side of said annulus a distance sufficient to project beyond said one end of a pipe encircled by said annulus and engage a second pipe confronting the encircled pipe, to a second position in which said support member does not extend beyond said one end of the encircled pipe; and means for releasably locking each of said support members in said first position.

2. A clamp according to claim 1 wherein said annulus comprises a pair of arcuate members having corresponding ends confronting one another, and including means joining the confronting ends of said arcuate members to one another.

3. A clamp according to claim 2 wherein the means joining one pair of confronting ends of said arcuate members is pivotal.

4. A clamp according to claim 3 wherein the means joining the other pair of confronting ends of said arcuate members is removable.

5. A clamp according to claim 1 wherein the means mounting each of said support members on said annulus is pivotal and permits swinging movement of its associated support member.

6. A clamp according to claim 1 wherein the means mounting each of said support members on said annulus is slideable circumferentially of said annulus.

7. A clamp according to claim 1 wherein each of said support members carries an adjustable member adapted for engagement with the second length of pipe.

8. A clamp according to claim 7 wherein each of said adjustable members is adjustable radially of said annulus when the associated support member is in said first position.

9. A clamp according to claim 1 wherein each of said force applying members terminates at its radially inner end in a swivel foot.

10. A clamp according to claim 1 including reinforcing means carried by said annulus and extending axially beyond the opposite side of said annulus.

11. A reforming pipe clamp adapted to encircle a length of pipe adjacent one end thereof, said clamp comprising a rigid annulus having an inside diameter greater than the outside diameter of the pipe to be encircled; a plurality of circumferentially spaced housings carried by said annulus; a plurality of support members adapted to support a second length of pipe in end-to-end confrontation with a pipe encircled by said annulus, each of said support members being accommodated in one of said housings for sliding movements relative thereto from a first position in which said support member extends axially beyond one side of said annulus a distance sufficient to project beyond one end of a pipe encircled by said annulus and engage a second pipe confronting the encircled pipe, to a second position in which said support member does not extend beyond said one end of the encircled pipe; and means for preventing movement of each of said support members radially outward of said annulus.

12. A clamp according to claim 11 wherein the means for preventing the radially outward movement of each of said support members comprises a slot in said support member and a pin carried by the associated housing and extending through said slot.

* * * * *